(Model.) 3 Sheets—Sheet 1.
W. GILFILLAN.
SPRING HINGE.
No. 353,853. Patented Dec. 7, 1886.
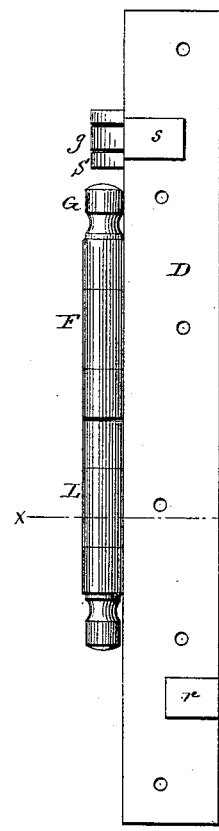
Fig. 1
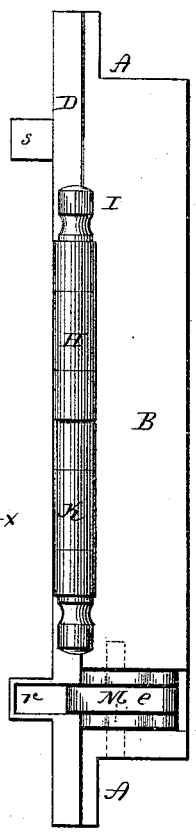
Fig. 2
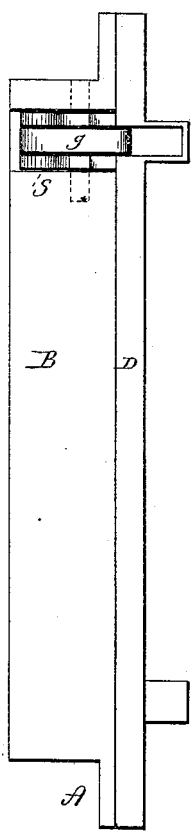
Fig. 3
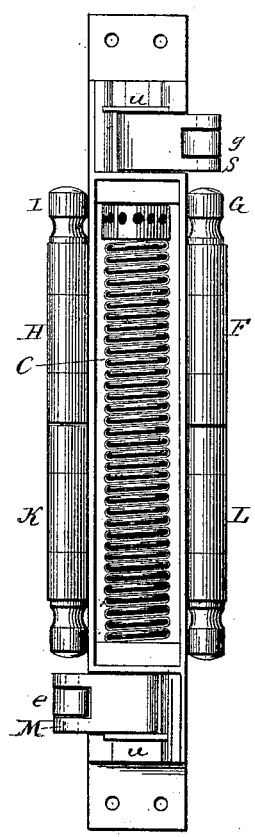
Fig. 4
Fig. 5
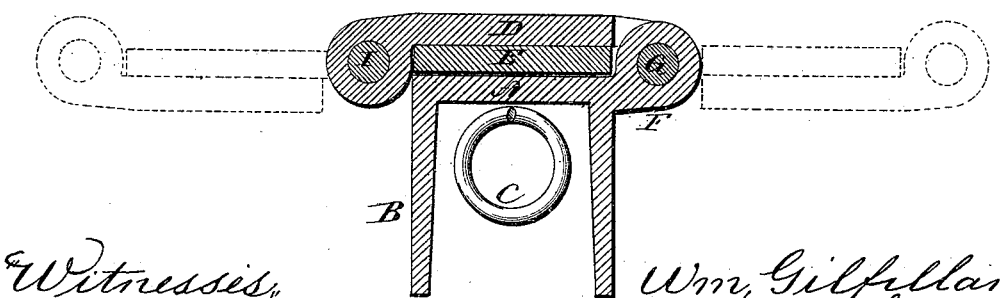

(Model.) 3 Sheets—Sheet 2.
W. GILFILLAN.
SPRING HINGE.
No. 353,853. Patented Dec. 7, 1886.
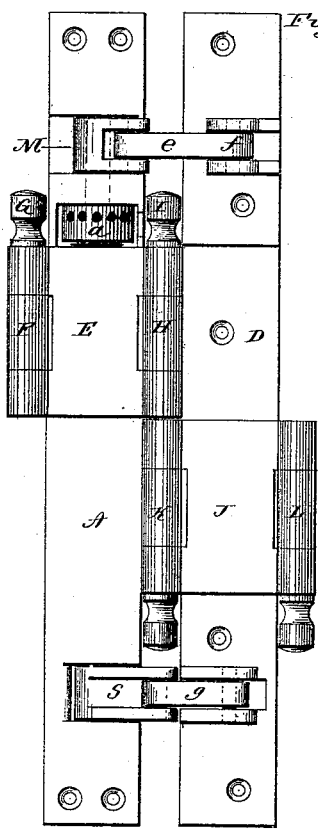
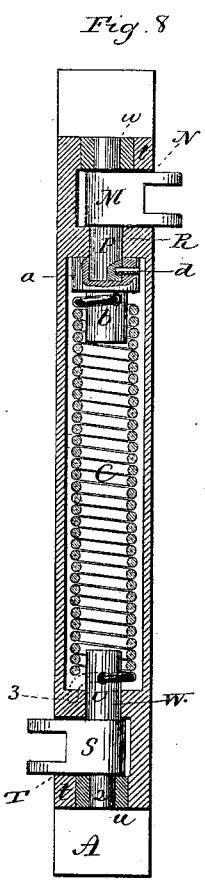
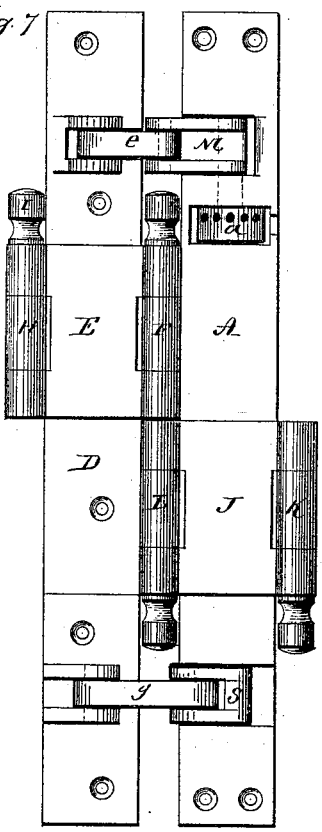
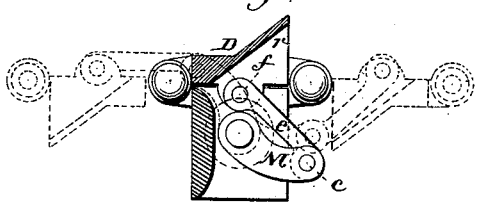
Witnesses.
J. H. Shumway
Fred C. Earle
Wm Gilfillan, Inventor
By Atty
John C. Earle

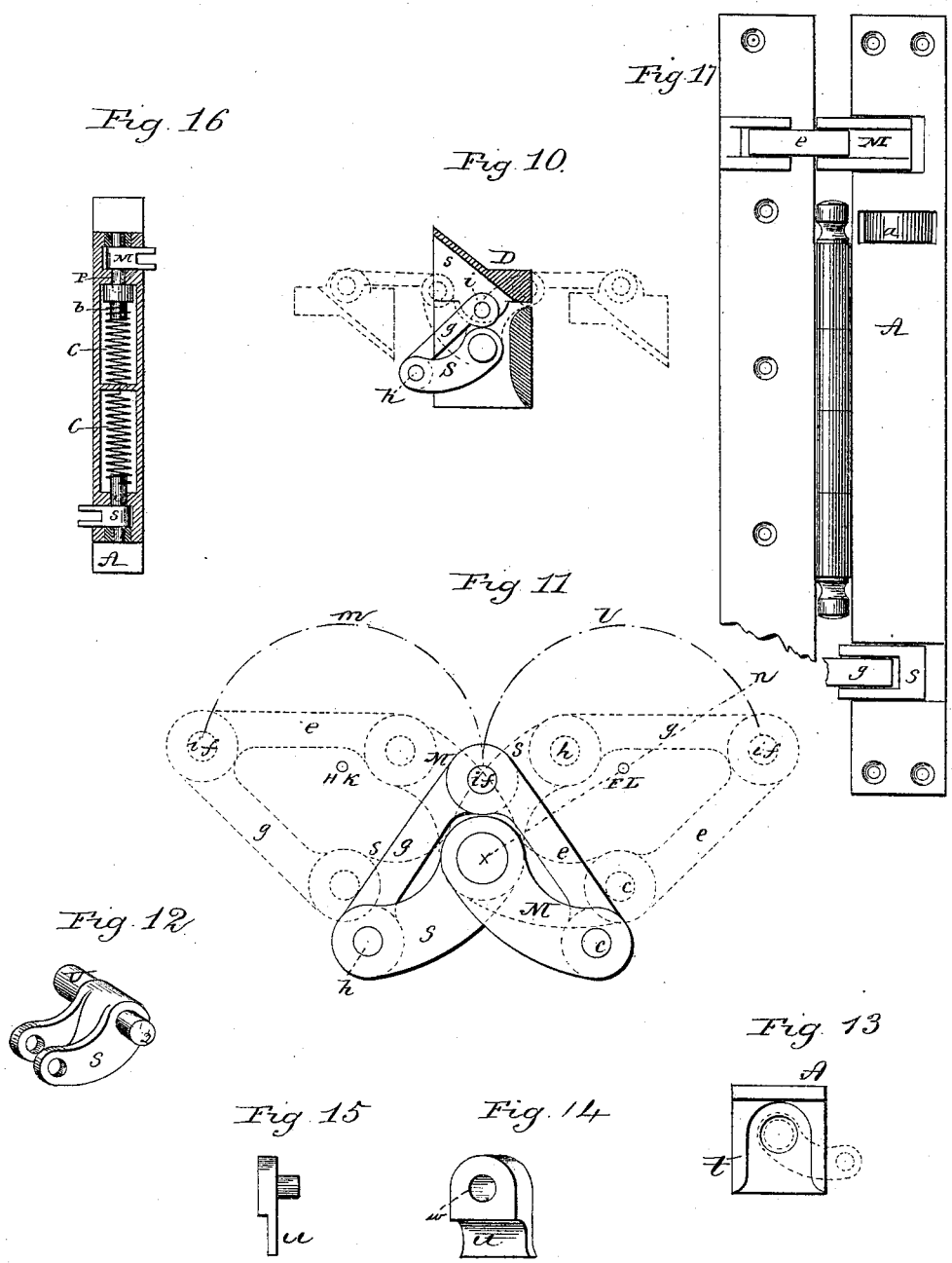

UNITED STATES PATENT OFFICE.

WILLIAM GILFILLAN, OF NEW HAVEN, CONNECTICUT, ASSIGNOR TO SARGENT & CO., OF SAME PLACE.

SPRING-HINGE.

SPECIFICATION forming part of Letters Patent No. 353,853, dated December 7, 1886.

Application filed August 16, 1886. Serial No. 210,980. (Model.)

*To all whom it may concern:*

Be it known that I, WILLIAM GILFILLAN, of New Haven, in the county of New Haven and State of Connecticut, have invented a new Improvement in Spring-Hinges; and I do hereby declare the following, when taken in connection with accompanying drawings, and the letters of reference marked thereon, to be a full, clear, and exact description of the same, and which said drawings constitute part of this specification, and represent, in—

Figure 1, a view of the hinge, looking upon the back of the swinging plate; Fig. 2, a side view looking from the right of Fig. 1; Fig. 3, a side view looking from the left of Fig. 1; Fig. 4, a rear view looking into the spring-chamber; Fig. 5, a transverse section cutting through one of the auxiliary flaps, enlarged for convenience of illustration; Fig. 6, an open face view showing the flap as turned to the right; Fig. 7, an open face view showing the swinging flap as turned to the left; Fig. 8, a vertical central section through the spring-chamber, looking toward the flaps; Fig. 9, a transverse section cutting through the recess in which the lever M is hung, showing a top view of that lever and its link; Fig. 10, a transverse section cutting through the recess in which the lever S is hung and showing a top view of that lever and its link; Fig. 11, an enlarged view of the levers and their links for the purpose of showing the movements of the same; Fig. 12, a perspective view of one of the levers, S, detached; Fig. 13, an end view of the flap A, showing the projection *t*, in which the auxiliary bearing for the levers is arranged; Fig. 14, a perspective view of the auxiliary bearing detached; Fig. 15, a side view of a modification in the auxiliary bearing; Fig. 16, a modification showing the spring as made in two parts, reduced scale; Fig. 17, a face view of a single-acting hinge open, showing the application of the spring to a single-acting hinge.

This invention relates to an improvement in that class of spring-hinges which are adapted to act upon the door from both directions of opening, and so as to bring it to its normal or closed position irrespective of the direction in which the door has been opened, commonly called "double-acting hinges," and particularly to that class which are adapted to the use of a single spring. In this class of hinges, as heretofore constructed, either one end of the spring has been held while the door opened against the other end in one direction, and then the said other end of the spring held while the door opened against the one end in the opposite direction, one end of the spring only acting in each direction. The full torsion, therefore, for the action is produced from a single end of the spring, according to the direction in which the door is opened. In other cases the spring has been constructed to act in reverse directions from the same end; but in either case the strain of the spring, exerting its power first in one direction and then in the other, is very great, and the spring under such constant and opposite strains gradually weakens, and, owing to this fact, frequently breaks.

The object of my invention is to construct a hinge so as to permit a door to swing in either direction, and which is adapted to the use of a single spring, both ends of which may be active, but always active in the same direction, irrespective of whether the door be open in one direction or the other.

A is one flap, and may be called the "base" of the hinge, and it is constructed for attachment to the door or jamb, as the case may be. Upon its back or reverse side is a box-like projection, B, to receive the spring, (see Fig. 5,) which is adapted to receive and forms a case for the helical spring C.

D is the second flap, which is constructed for attachment to the door or jamb, accordingly as the part A is attached. The part D is hung to the part A by an auxiliary flap, E, the said flap being hung to one side of the flap A by a common knuckle joint, F, and pintle G, and, extending across the face of the flap A, is hung by a like knuckle-joint, H, to the opposite side of the flap D by a pintle, I, (see Figs. 5 and 6,) and the second auxiliary flap, J, is hung to the side of the flap A opposite to that by which the flap E is connected to the flap A by a knuckle-joint, K, and the opposite edge of the flap J is hung to the side of the flap D opposite the knuckle H by a knuckle, L, the two auxiliary flaps E J preferably occupying the central portion of the two flaps, one above the other, as seen in Figs. 6 and 7; hence as the flap D is turned from the flap A—say to the right, as seen in Fig. 6—the knuckles H and K are the active joints, while the flap E remains stationary against the flap A and the flap J against the flap D. In swinging in the opposite direction, as seen in Fig. 7, the knuckles F and L become the active knuckles, the auxiliary flap E now lying upon the face of the flap D and the flap J upon the flap A, so that the two auxiliary flaps E J form a connection between the principal flaps A D, whereby the said flap A may be turned from the said flap D in either direction, accordingly as the door is opened—that is to say, they form substantially a common double-acting hinge arrangement.

At one end of the principal flap A, and, as here represented, above the spring-chamber, a lever, M, is hung in a recess, N, in the front face of the flap A. This lever is constructed with a trunnion, P, which extends into the spring-chamber through a bearing, R, and so as to be supported thereby, and be permitted to turn on the said trunnion as its axis, the trunnion being in axial line with the springs. At the opposite or lower end a like lever, S, is arranged in a recess, T, in the face of the flap A. This lever is also provided with a trunnion, U, which extends through a bearing, W, into the lower end of the spring-chamber.

The lever M extends to one side of the flap A, and the other lever, S, to the opposite side, as seen in Fig. 8, and as also seen, respectively, in Figs. 9 and 10, the two levers being shown enlarged in Fig. 11, X in said Fig. 11 representing the axis of both trunnions, which are in axial line with each other, and upon which the two levers may turn.

One end of the spring C is fixed to the one trunnion, U, and the other end of the spring to the trunnion at the other end; but to provide for increasing or decreasing the tension of the spring the trunnion P extends into a collar, $a$, arranged in the upper end of the spring-chamber, and this collar is connected to the end of the spring through a stud, $b$, extending therefrom into the spring, and as seen in Fig. 8. The collar $a$ is provided with a series of openings in its periphery, by which it may be rotated through an opening in the face of the flap A, and the trunnion P has a single hole, which stands in the path of the holes in the collar $a$. By turning the collar $a$ until the required tension is attained, by means of a pin, $d$, introduced through the hole in the collar corresponding to the hole in the trunnion, as seen in Fig. 8, the collar and trunnion will be connected, so that the turning of the trunnion will correspondingly turn the collar and that end of the spring. This device for adjusting the tension of the spring is one well known in this class of hinges.

The levers M S are free to turn upon their axes, and when so turned communicate rotation to the respective ends of the springs accordingly. To the free end of the lever M one end of a link, $e$, is hinged, as at $c$, the other end of the link hinged to the other flap, D, in the vertical central line of the flap, as at $f$, Fig. 9. To the free end of the other lever, S, one end of a like link, $g$, is hinged, as at $h$, the link extending to the flap D, where it is hinged, as at $i$, the axial line of the hinge $i$ being coincident with the axis of the hinge $f$ of the other link, the axial line of the two being central upon the face of the flap D; hence as the flap D is turned from the flap A the hinging-points $f$ and $i$ will be turned outward with the flap and according to the direction in which it is turned, whether it be to the right or left, as seen in Figs. 9 and 10.

To illustrate the action of the levers in the swinging of the hinge, reference is specially made to Fig. 11. In that figure, F L represent the axis of the two pintles, upon which the flap will swing in one direction, and H K the pintle, on which the same flap will swing in the opposite direction, these letters corresponding with the knuckles of the auxiliary flap-connection, before referred to. $i f$ represent the axis of the connection of the two links $e g$, as before referred to, these being one above the other and in the same axial line. This axis $i f$, therefore, turns with the swinging flap according to the direction in which it is turned, its normal position being at a point centrally between the axis of the knuckles upon which the said flap swings. Now, suppose the flap A to be turned to the right, swinging upon the axis F L, the joint $i f$ will be turned to the right accordingly, following the arc indicated by the broken line $l$. Under this movement the link $e$ will turn the lever M accordingly until, wide open, it arrives at the position indicated by broken lines at the right. At the same time the link $g$ will have drawn the lever S to the position also indicated in broken lines at the right. Thus the two levers, under the swinging movement of the flap, have been turned upon their own axis in opposite directions, because one extends in one direction from that axis and the other in the opposite direction; hence the two ends of the spring, connected to the respective levers, as before described, have been turned in opposite directions, and this, it will be understood, is in the direction of winding the spring. One may have been turned to a somewhat greater extent than the other; but the spring is wound from both ends at the same time. Now, in swinging in the opposite direction, the axis $i f$ of the swinging flap follows the arc indicated by the broken line $m$ to the left, and at wide open has carried the axis $i f$ to the extreme position indicated in broken lines at the left. Under this movement the lever M has been drawn around by the link $e$ to the position seen in broken lines at the same time the lever S, by its link $g$, has been drawn in the opposite direction, as also indicated in broken lines; but, as in the first instance, both levers have been turned upon their axes in opposite directions, but each in the same direction in which they were turned in the first swinging movement, so that precisely the same winding movement has been imparted to the spring as in the first instance, except that in turning to the right the greatest amount of movement was imparted to the lever S and the least to the lever M, whereas in swinging to the left the same greater extent of movement is imparted to the lever M and the same lesser movement to the lever S. The reaction of the spring is through the respective levers and links upon the flap to return it to its closed or normal position.

The position shown by broken lines in Fig. 11 is that of wide open, and in that position the reactive force of the spring upon the links is such as to hold the flap in that wide-open condition, whether it be to the right or left. This is due to the fact that the axis *i f* passes so far beyond a plane through the axis of the spring, and the axis upon which the flap was turned—say F L, Fig. 11, broken line *n* indicating that plane—that the greater power of the spring is exerted upon the opening side of that plane; but so soon as the flap is returned to bring the action of the levers greater on the closing side of the spring, then the flap will be closed. This hinge, therefore, will hold the door wide open in either direction, but will close it after it shall have been mechanically returned to a slight extent.

In swinging in one direction—say as to the right—the link *e* will be outside the plane of the flap, and, swinging in the opposite direction, the other link, *g*, will be outside of the plane. To permit the links to work through the face of the flap D, it is constructed with a recess, *r*, corresponding to the link *e*, (see Fig. 9,) and with a recess, *s*, corresponding to the link *g*, (seen in Fig. 10,) and so that as the flap is turned to the right, as seen in broken lines, Fig. 9, the link *e* will work into that recess *r*, and when turned to the left the link *g* will work into the recess *s*, as seen at the left in Fig. 10.

The levers M S are each formed with their trunnions as an integral part thereof, as seen in Fig. 12, this being a cheaper and better construction than to form the trunnion as a separate piece to be introduced through the hub of the lever. It is also desirable that the levers should be supported upon a trunnion extending from both sides; and that the lever so constructed may be introduced to its place, a U-shaped projection, *t*, is made upon the back of the flap A, one above the recess in which one lever works, and the other below. (See Figs. 8 and 13.) The opening or space in this projection is greater than the width of the lever, the lever being shown in broken lines, Fig. 13. This opening is directly in line with the bearing in which the trunnion of the lever rests. Into the opening in this projection a bearing-piece, *u*, is fitted, (see Fig. 14,) this piece having a hole, *w*, therein, so as to stand in axial line with the fixed bearing for the trunnion, and on the side of the lever opposite the principal trunnion, a trunnion, 2, is formed, corresponding to the hole *w* in the bearing-piece *u*. The recess in the projection *t* permits the lever to be introduced with the principal trunnion inward, and until it comes to its place of rest, as seen in Fig. 8. Then the bearing-piece *u* is set into the projection *t*, over the trunnion, as seen in Fig. 8, so as to form a bearing for the outer end of the respective trunnions. By the introduction of this bearing-piece both trunnions may be made as an integral part of the lever; but, if it be preferred, the outer trunnion may be formed as a part of the bearing-piece *u*, as seen in Fig. 15, the lever having a recess formed in it concentric with the trunnion upon the inner side to receive the trunnion on the bearing-piece.

By employing two levers, the one extending in one direction and the other in the opposite direction, with the link-connections, as I have described, the force exerted by the spring in opening the door is precisely alike in both directions. One of the links and its lever may be omitted, the other end of the spring being made fast in its case, say, as by turning that end of the spring into a corresponding hole, as indicated at 3 in broken lines, Fig. 8, the lever S being the lever which is dispensed with; but under such arrangement, while the power of the spring will be exerted in the same direction upon the lever irrespective of the direction in which the swinging flap is turned, the extent of movement of the lever will be somewhat greater in one direction than the other, and consequently a correspondingly greater force will be exerted in one direction than the other.

I prefer to make the spring a single spring, as I have described, so that one lever acts directly upon one end and the other lever directly upon the other end, thus working the same spring from opposite ends, but always in the same direction irrespective of the direction in which the door is opened; but the spring may be in two parts, as seen in Fig. 16, one end of one fixed to one lever, the opposite end of the other spring fixed to the opposite lever, and the other end of the two springs rigidly fixed in the spring-chamber, as seen in said Fig. 16. In this case there will be the same action upon the spring as in the first illustration—that is to say, the power of the springs will always be in the same direction, never changing.

The advantages of working from both ends of the spring, and always in the same direction, irrespective of the direction in which the door is swung, over a spring in which the action of the spring in one direction is counter to that in the opposite direction, will be readily apparent to those skilled in the use of this class of springs. Not only is the spring made more effective, but its durability is greatly increased.

The advantages of working from both ends of the spring may be attained in a single-acting hinge—that is to say, instead of connecting the two flaps A D by the intermediate or auxiliary flaps, E J, whereby the one flap, D, may be turned in either direction from the flap A, the two flaps may be directly hinged together on one side, as seen in Fig. 17, and become a single-acting hinge, with the arrangement of levers and connections with the spring the same as I have described for the double-acting hinge, and this hinge will operate upon the spring precisely the same as does the double-acting hinge when working only in one direction. The torsion of the spring is produced at both ends the same as in a double-acting hinge, and all the advantages of applying the power to both ends of the spring are retained in the single hinge as in the double-acting hinge. I therefore do not wish to be understood as limiting my invention to a double-acting hinge.

I claim—

1. The combination of the flap A, the flap D, and auxiliary flaps E J, the one flap, E, hung by one edge to one edge of the flap A, and by the opposite edge to the opposite edge of the flap D, and the flap J hinged to the flap A upon its edge opposite that to which the flap E is hung, and also hung to the flap D upon the opposite edge to which the said flap E is hung thereto, the said auxiliary flaps lying between the said flaps A D, the flap A constructed with a spring-chamber upon its back, a torsion-spring, C, arranged in said chamber, its axis parallel with the face of the said flap, a lever, M, hung in a recess in said flap A and upon an axis concentric with the axis of the said torsion-spring, and so as to swing in a plane at right angles to the plane of said flap, the said lever M constructed with a trunnion, P, to form its axis, and extending through a bearing, R, into the spring-chamber, and there connected to one end of the spring, a like lever, S, hung in a corresponding recess at the opposite end of the spring-chamber, and constructed with a trunnion, U, to extend through a bearing, W, into said spring-chamber, and that end of the spring connected with the said trunnion U, the said lever S adapted to swing upon its axis in a plane parallel with the lever M, the said lever M extending in one direction from its axis, and the other lever, S, in an opposite direction, a link, e, hung by one end to the free end of the lever M, its other end hinged centrally upon the face of the flap D, and a like link, g, hung by one end to the free end of the lever S, and by its other end centrally hung to the flap, the axis upon which the said two links are hung to the said flap being parallel with the axis upon which the said flap turns, and midway between the said axes, substantially as described.

2. The combination of the flap A, the flap D, and auxiliary flaps E J, the one flap, E, hung by one edge to one edge of the flap A, and by the opposite edge to the opposite edge of the flap D, and the flap J hinged to the flap A upon its edge opposite that to which the flap E is hung, and also hung to the flap D upon the opposite edge to which the said flap E is hung thereto, the said auxiliary flaps lying between the said flaps A D, the flap A constructed with a spring-chamber upon its back, a torsion-spring, C, arranged in said chamber, its axis parallel with the face of the said flap, a lever, M, arranged in a transverse recess in said flap A, provided with a trunnion, P, extending through a bearing, R, into said spring-chamber, a collar, a, within said spring-chamber and in connection with the end of the spring next said trunnion, the other end of the spring being supported to resist its turning at the said collar end, the said collar adapted to be rotated, means, substantially such as described, to engage said trunnion P with said collar, and a link, e, hung by one end to the free end of said lever M, and by its other end to the said flap D at a point midway between the axis upon which the said flap may turn, substantially as described.

3. In a spring-hinge substantially such as described, the one flap constructed with a spring-chamber upon its back, a torsion-spring arranged therein, the axis of which is substantially parallel with the plane of said flap, a lever arranged to work in a transverse recess in said spring-chamber flap, the said lever constructed with a trunnion extending through a bearing into the said spring-chamber, the axis of said trunnion being parallel with the axis of the spring, and also constructed with a corresponding trunnion upon the opposite side of said lever and in axial line with the said first trunnion, the said first trunnion so extending into the said spring-chamber connected with one end of said torsion-spring, the other end of said spring being supported as a resistance against the turning of the spring at the one end, and a projection, t, on the back of said flap, and upon the side of the recess in which the lever swings opposite the end of the spring-chamber, the said projection t constructed with a recess corresponding in shape to the hub portion of the lever, with a bearing-block, u, adapted to fit the recess in said projection t, and the said bearing-block having a hole, w, therein corresponding to the trunnion on that side of the lever, substantially as described.

4. A spring-hinge consisting of two flaps hinged together, whereby the one flap may be turned toward or from the other, the combination therewith of a torsion-spring arranged upon one of said flaps whose axis is substantially parallel with the axis upon which the swinging flap turns, two levers, one arranged at one end of said spring and the other at the opposite end, each in connection with its end of the spring, both levers arranged to swing in planes at substantially right angles to the axis of the spring, the said levers extending from their axes in opposite directions, and a link hinged by one end to the free end of one lever and by the other end hinged to the swinging flap, and a like link hinged by one end to the free end of the other lever, and the other end of said second link also hinged to the said swinging flap, the axial line of the hinge between the said links and the swinging flap being parallel with the axis upon which the said swinging flap turns, substantially as described.

WILLIAM GILFILLAN.

Witnesses:
WM. S. COOKE,
CHAS. L. BALDWIN.